(12) United States Patent
Rocca et al.

(10) Patent No.: US 7,308,007 B2
(45) Date of Patent: Dec. 11, 2007

(54) INCREASED LASER OUTPUT ENERGY AND AVERAGE POWER AT WAVELENGTHS BELOW 35 NM

(75) Inventors: Jorge J. Rocca, Fort Collins, CO (US); David Alessi, Fort Collins, CO (US); Bradley M. Luther, Fort Collins, CO (US); Mark Berrill, Colorado Springs, CO (US); Miguel A. Larotonda, Fort Collins, CO (US); Yong Wang, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 469 days.

(21) Appl. No.: 11/021,217

(22) Filed: Dec. 23, 2004

(65) Prior Publication Data

US 2006/0140227 A1    Jun. 29, 2006

(51) Int. Cl.
*H01S 3/30* (2006.01)
*H01S 3/14* (2006.01)
*H01S 3/091* (2006.01)

(52) U.S. Cl. .............................. 372/5; 372/69; 372/76
(58) Field of Classification Search ..................... 372/6
See application file for complete search history.

(56) References Cited

U.S. PATENT DOCUMENTS

| | | | | |
|---|---|---|---|---|
| 4,704,718 A | * | 11/1987 | Suckewer | 372/5 |
| 5,003,543 A | * | 3/1991 | Morsell et al. | 372/5 |
| 5,089,711 A | * | 2/1992 | Morsell et al. | 250/492.3 |
| 5,394,411 A | * | 2/1995 | Milchberg et al. | 372/5 |
| 5,832,007 A | * | 11/1998 | Hara et al. | 372/5 |
| 6,061,379 A | * | 5/2000 | Schoen | 372/76 |
| 6,980,625 B2 | * | 12/2005 | Kieffer et al. | 378/37 |
| 2004/0264512 A1 | * | 12/2004 | Hartlove et al. | 372/5 |

OTHER PUBLICATIONS

P.V. Nickles et al., "Short Pulse X-Ray Laser at 32.6 nm Based on Transient Gain in Ne-like Titanium." Physical Review Letters, vol. 78, No. 14, pp. 2748-2751, The American Physical Society (Apr. 7, 1997).

R. Keenan et al., "Efficient Pumping Schemes for High Average Brightness Collisional X-ray lasers." Proceedings of SPIE, vol. 5197, pp. 213-220 (2003).

R. Tommasini et al "Investigations on 10-Hz sub-Joule fs-laser pumped neon- and nickel-like X-ray lasers." Proceedings of SPIE, vol. 4505, pp. 85-92 (2001).

(Continued)

*Primary Examiner*—Minsun Oh Harvey
*Assistant Examiner*—Phillip Nguyen
(74) *Attorney, Agent, or Firm*—Samuel M. Freund; Cochran Freund & Young LLC

(57) ABSTRACT

Saturated tabletop lasers having increased output energy and operating at 5 Hz repetition rate, were demonstrated at wavelengths about 18.9 nm for molybdenum targets, 16.4 nm for ruthenium targets, 14.7 nm for palladium targets, 13.9 nm for silver targets, and 13.2 nm for cadmium targets in transitions of nickel-like ions. The results were obtained using a sequence of two, plasma-generating pre-pulses, each having sub-Joule energy followed after a selected delay period by picosecond laser plasma excitation pulses having with an energy of about 1 J at angles of incidence optimized for maximum energy deposition.

36 Claims, 5 Drawing Sheets

OTHER PUBLICATIONS

J. Dunn et al., "Gain Saturation Regime for Laser-Driven Tabletop, Transient Ni-Like Ion X-Ray Lasers." Physical Review Letters, vol. 84, No. 21, pp. 4834-4837, The American Physiclal Society (May 22, 2000).

S. Sebban et al., "Saturated Amplification of a Collisionally Pumped Optical-Field-Ionization Soft X-Ray Laser at 41.8 nm." Physical Review Letters, vol. 86, No. 14, pp. 3004-3007, The American Physiclal Society (Apr. 2, 2001).

S. Sebban et al., "Demonstration of a Ni-Like Kr Optical-Field-Ionization Collisional Soft X-Ray Laser at 32.8 nm." Physical Review Letters, vol. 89, No. 25, pp. 253901-1-253901-4, The American Physiclal Society (Dec. 16, 2002).

K.A. Jenulewicz et al., "Saturated Ni-like Ag x-ray laser at 13.9 nm pumped by a single picosecond laser pulse." Physical Review A 68, 051802 (R), The American Physiclal Society (2003).

R.E. King et al "Saturated x-ray lasers at 196 amd 73A pumped by a picosecond traveling-wave excitation." Physical Review A, vol. 64, pp. 053810-1-053810-12 (2001).

V. N. Shlyaptsev et al "Numerical studies of transient and capillary x-ray lasers and their applications." Proceedings of SPIE, vol. 5197, pp. 221-228 (2003).

B.R. Benware et al., "Demonstration of a High Average Power Tabletop Soft X-Ray Laser." Physical Review Letters, vol. 81, No. 26, pp. 5804-5807, The American Physiclal Society (Dec. 28, 1998).

C.D. Macchietto et al., "Generation of millijoule-level soft-x-ray laser pulses at a 4-Hz repetition rate in a highly saturated tabletop capillary discharge amplifier." Optics Letters, vol. 24, No. 16, pp. 1115-1117, Optical Society of America (Aug. 15, 1999).

* cited by examiner

INCREASED LASER OUTPUT ENERGY AND AVERAGE POWER AT WAVELENGTHS BELOW 35 NM

STATEMENT REGARDING FEDERAL RIGHTS

This invention was made with National Science Foundation (NSF) Center for Extreme Ultraviolet Science and Technology under NSF support under NSF Award No. EEC-0310717; NSF Grant No. ECS-9977677. The government has certain rights in the invention.

FIELD OF THE INVENTION

The present invention relates generally to soft x-ray lasers and, more particularly, to a method and apparatus for increasing the output intensity thereof.

BACKGROUND OF THE INVENTION

The widespread use of coherent soft x-ray light in numerous areas of science and technology requires the development of small-scale sources. Significant effort has been placed in the development of high repetition rate soft x-ray lasers. Discharge pumped lasers operating at 4-10 Hz repetition rate have produced milliwatts of laser average power at a wavelength of 46.9 nm [See, e.g., B. R. Benware et al., Phys. Rev. Lett. 81, 5804 (1998), and C. D. Macchieto et al., Opt. Lett. 24 1115 (1999)]. More recently, laser-pumped saturated optical field ionization lasers operating in Pd-like Xe at 41.8 nm and in Ni-like Kr at 32.8 nm have been demonstrated at repetition rates of 10 Hz using femtosecond optical laser excitation pulses of 0.33 J and 0.76 J pulses, respectively [See, e.g., S. Sebban et al., Phys. Rev. Lett. 86, 3004 (2001); and S. Sebban et al., Phys. Rev. Lett. 89, 253901 (2002)]. However, these excitation procedures have produced only saturated lasers at wavelengths above 30 nm to date. Many applications required the development of high repetition rate lasers capable of operating at shorter wavelengths.

Transient collisional electron excitation of targets using a sequence of two laser pulses impinging on the target at near-normal incidence has produced several saturated lasers in the 12-23 nm range, but required 3-10 J of pump energy, which contributed to limit operating repetition rates to only one shot every several minutes [See, e.g., P. V. Nickles et al., Phys. Rev. Lett. 78, 2748 (1997); and J. Dunn et al., Phys. Rev. Lett. 84, 4834 (2000); and K. A. Janulewicz et al., Phys. Rev. A 68, 051802 (2003).]. Where more than two laser excitation pulses impinging at normal incidence to a suitable target are used, the saturated x-ray laser gain was found to increase in some situations, and decrease in others [See, e.g., R. E. King et al., Phys. Rev. 64, 053810 (2001).].

Several excitation schemes have been investigated to reduce the necessary pumping energy and enable operation at higher repetition rates. For example, excitation of a Mo target with 150 fs, 300 mJ pulses impinging at 60° from normal incidence resulted in the appearance of the 18.9 and 22.6 nm laser lines of Ni-like Mo [See, e.g., R. Tommasini et al., Proc. of SPIE 4505, 85 (2001)], but this procedure did not produce sufficient amplification to have practical interest.

Recently, it has been demonstrated that the energy deposition efficiency of a short laser pulse can be significantly increased by directing it at grazing incidence [See, e.g., V. N. Shlyaptsev et al., Proc. of SPIE 5197, 221 (2003); and R. Keenan et al., Proc. of SPIE 5197, 213 (2003)]. In this scheme, a first laser pulse impinges on a target of selected material creating a plasma that is subsequently rapidly heated by a second pulse of picosecond duration to create a population inversion and soft x-ray laser amplification. This inherently traveling wave pumping geometry takes advantage of the refraction of the second pulse in the plasma created by the first pulse to increase its path length through the gain region of the plasma, thereby increasing the fraction of the pump energy absorbed in that region.

Accordingly, it is an object of the present invention to provide a method for increasing the output energy of soft x-ray lasers excited by grazing incidence laser pumping.

It is another object of the present invention to provide soft x-ray lasers excited by grazing incidence laser pumping having increased output energy and average power.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects of the present invention, and in accordance with its purposes, as embodied and broadly described herein, the method for generating soft x-ray laser radiation hereof includes the steps of: directing at least one first laser pulse having a first chosen energy and a first chosen pulse width onto an exposed surface of a target comprising selected atoms at a first angle to the normal to the surface effective for generating an expanding plasma in the vicinity of the surface comprising ions of the selected atoms; directing a second laser pulse having a second chosen energy and a second chosen pulse width onto the surface of the selected target at a second angle to the normal to the surface effective for increasing the degree of ionization of the ions of the expanding plasma, at a first chosen time after the step of directing the at least one first laser pulse onto the target; and directing a plasma excitation pulse having a third chosen energy and a third chosen pulse width into the plasma at a third chosen angle to the normal to the surface of the target effective for producing a population inversion in the ions of the plasma, said third chosen angle being greater than 40°, and at a second chosen time after the step of directing a second laser pulse onto the target, whereby soft x-ray laser radiation is generated.

In another aspect of the present invention, and in accordance with its objects and purposes, the apparatus for generating soft x-ray laser radiation includes: a target comprising selected atoms; means for generating at least one first laser pulse having a first chosen energy and a first chosen pulse width; means for directing the at least one first laser pulse onto an exposed surface of the target at a first angle to the normal to the surface of the target such that an expanding plasma comprising ions of the selected atoms is generated in the vicinity of the surface; means for generating a second laser pulse having a second chosen energy and a second chosen pulse width at a first chosen time after the at least one first laser pulse; means for directing the second laser pulse onto the surface of the target at a second angle to the normal to the surface of the target such that the degree of ionization of the ions of the expanding plasma is increased; means for generating a plasma excitation pulse having a third chosen energy, the third chosen angle being greater than 40° to the normal to the surface of the target and a third chosen pulse width at a second chosen time after the second laser pulse; and means for directing the plasma excitation pulse into the expanding plasma at a third chosen angle to the normal to the surface of the target, such that a population inversion in the ions of the plasma is produced, and soft x-ray laser radiation is generated.

Benefits and advantages of the present method include the generation of soft x-radiation having increased intensity and improved efficiency at wavelengths below 35 nm at high repetition rates from numerous atomic species.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Briefly, the present invention includes an apparatus and method for increasing the output intensity of optically pumped, saturated collisional soft x-ray lasers excited by grazing ($\geq 40°$ to the normal to the surface of the target material employed) incidence laser pumping, where a laser pre-pulse having normal incidence to a target generates a plasma which is subsequently excited by another laser pulse directed therethrough. An earlier pre-pulse directed to the same location on the target as the now second prepulse, has been found to significantly increase the output intensity of the laser for Ni-like metal ions. Although the details of the exact process involved are being investigated, without intending to limit the scope of the present invention, it is believed that since absorption of radiation in a plasma volume is related to the electron density and temperature, and its propagation is determined by the electron density gradients within the plasma, the early pre-pulse assists in creating a pre-plasma with decreased density gradients and simultaneously favorable absorption conditions for the pump beam in which the subsequent excitation by the main pulse gives rise to a more robust and increased gain region in which the soft x-ray radiation will propagate, thereby experiencing an increased integrated gain. The invention has been demonstrated for Ni-like Cd ions lasing at about 13.2 nm, Ni-like Ag ions lasing at about 13.9 nm, Ni-like Pd lasing at about 14.7 nm, Ni-like Ru targets lasing at about 16.4 nm, and Ni-like Mo ions lasing at about 18.9 nm. but it is anticipated by the present inventors that soft x-ray lasers comprising plasmas containing other Ni-like ions, such as Sn and Sb, as examples, and other ions useful for generating soft x-ray laser radiation by collisional electron impact excitation, such as Ne-like ions, as examples, will exhibit similar improvement.

Figure 1:
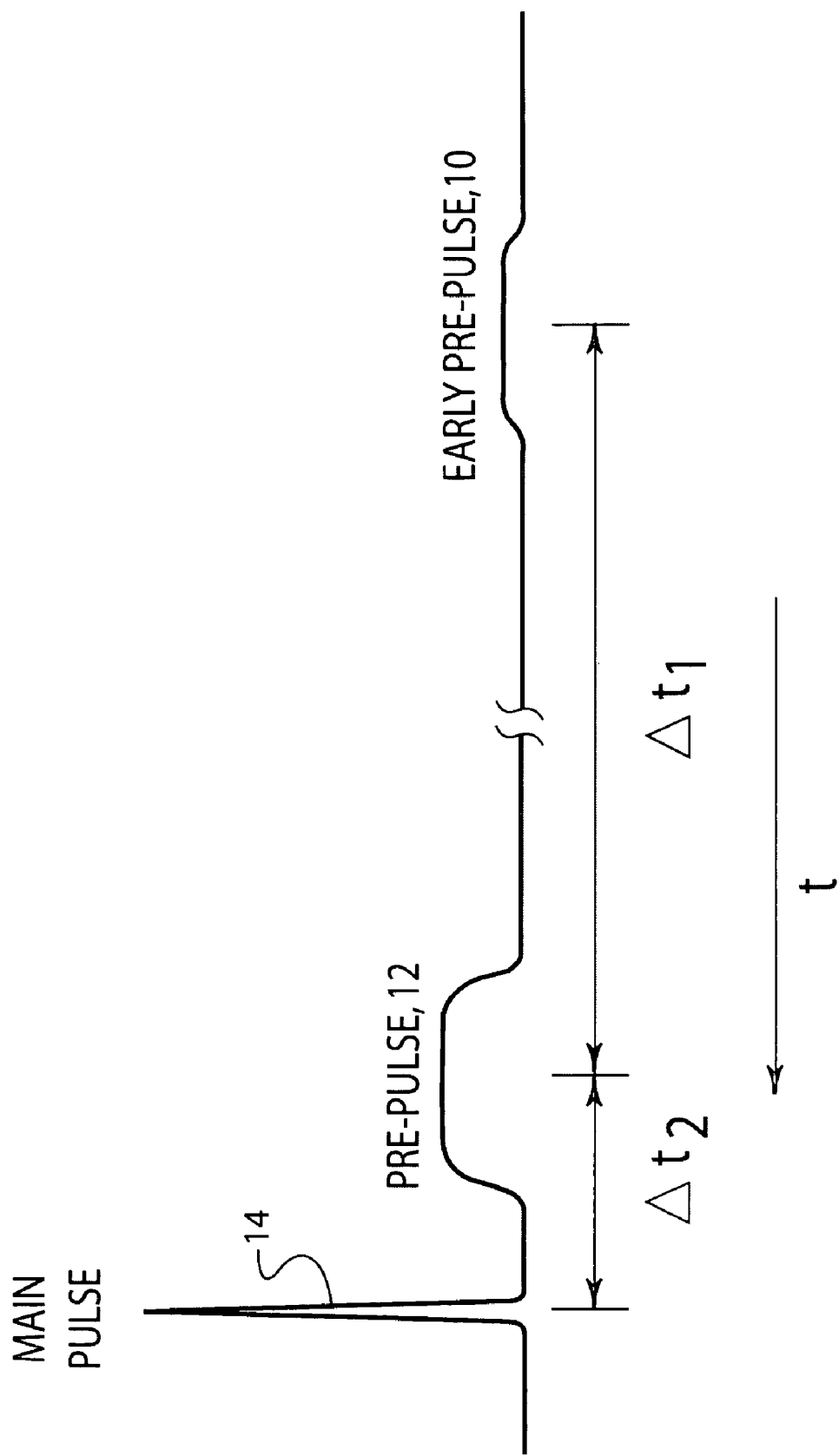
FIG. 1 is a schematic representation of the multi-pulse sequence for excitation of a population inversion in a target plasma suitable for soft x-ray lasing, showing a first (early) pre-pulse for generating a plasma which includes ions of atoms from a chosen target, a second pre-pulse for increasing the degree of ionization of the plasma, and a main pulse for producing a population inversion in the plasma effective for generating laser radiation; time evolves from right to left in the FIGURE.

Reference will now be made in detail to the present preferred embodiments of the invention examples of which are illustrated in the accompanying drawings. In what follows, identical callouts will be used for similar or identical structure. Turning now to FIG. 1, a schematic representation of the pulse sequence for excitation of a population inversion in a target plasma suitable for soft x-ray lasing is shown. First (early) pre-pulse, 10, and second pre-pulse, 12, having a chosen spacing in time, $\Delta t_1$, generate a plasma which includes ions of atoms from a chosen target, and main pulse, 14, delayed from pre-pulse 12, by $\Delta t_2$, produces a population inversion in the plasma effective for generating laser radiation. Time, t, evolves from right to left in FIG. 1.

As understood by the present inventors, and not intended to limit the scope of the invention, the early pre-pulse generates a plasma containing ions of the chosen target material prior to the arrival of the pre-pulse that precedes the main excitation pulse. As this plasma expands, the level of ion excitation diminishes. The second pre-pulse increases the ion excitation to the desired Ni-like ionic states, while the main excitation pulse establishes the required population inversion. It should be pointed out at this point that those skilled in the art would understand that a greater number of suitably chosen pulses than 3 would also be useful for generating soft x-ray laser operation. Moreover, the use of a sufficiently prolonged foot on the rising edge of a pre-pulse would also be expected to provide a similar result.

Figure 2:
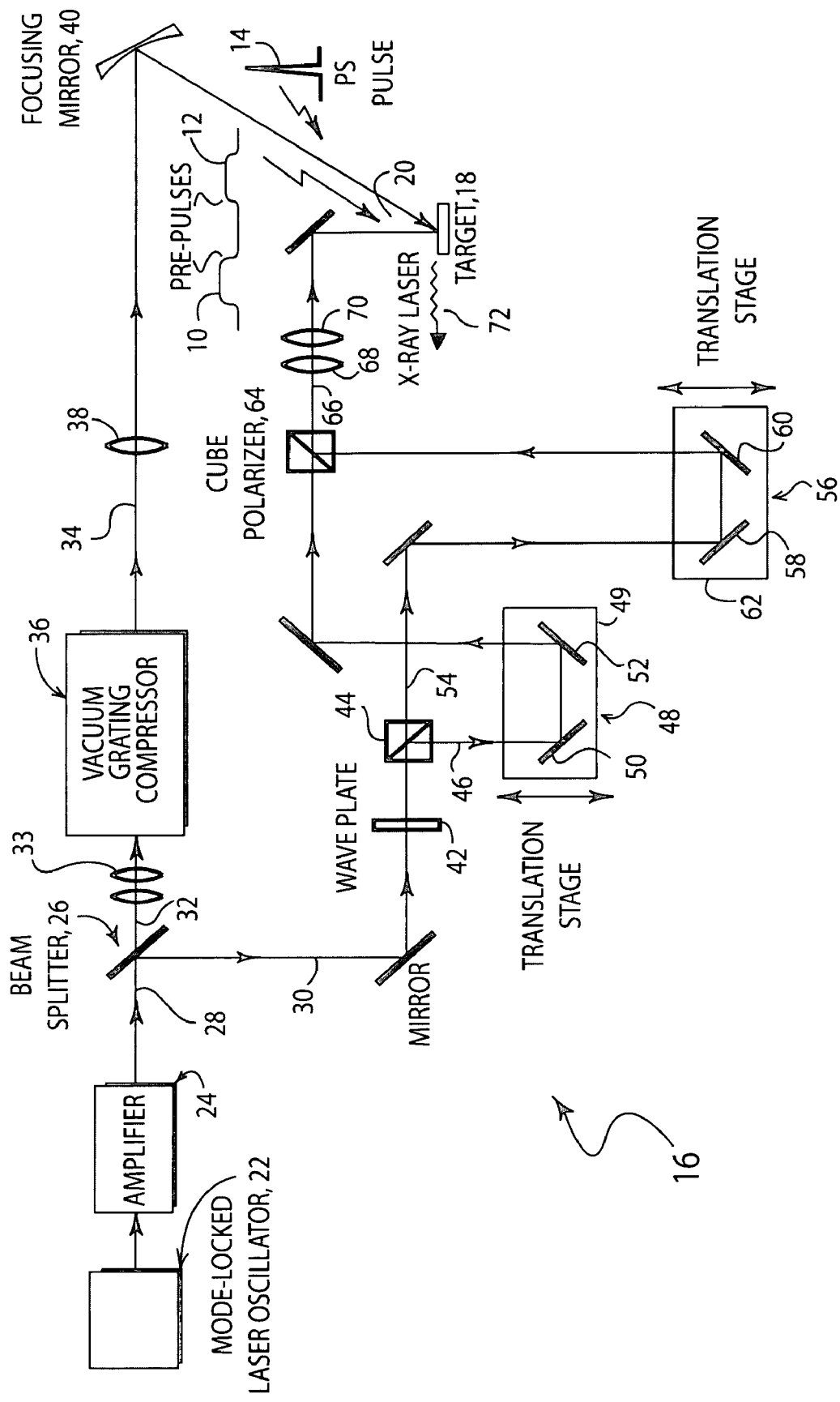
FIG. 2 is a schematic representation of one embodiment of the apparatus for generating soft x-ray laser radiation in accordance with the teachings of the present invention, illustrating, in particular, the two pre-pulses being directed approximately normal to the chosen target, while the main pulse is directed at a chosen grazing incidence angle thereto.

FIG. 2 is a schematic representation of one embodiment of the apparatus, 16, for generating soft x-ray laser radiation in accordance with the teachings of the present invention, illustrating, in particular, pre-pulses 10 and 12 being directed at approximately normal incidence to chosen target, 18, while main pulse 14 is directed at an angle chosen to optimize the soft x-ray laser output relative to the normal, 20, thereto. That is, the angle of incidence of the third pulse is selected to optimally couple the pump laser energy into the plasma region having suitable electron density of laser amplification. For example, grazing angles between 67° and 76° relative to the normal to the surface of the target have been successfully used to excite transient collisional lasers in numerous Ni-like ions between molybdenum and tin. It is expected that angles greater than about 40°, and more preferably between about 50° and 80°, will also be useful in accordance with the teachings of the present invention. It should be mentioned that the pre-pulses do not have to be normal to the target to achieve soft x-radiation, and that main or third pulse energies between about 0.1 J and 100 J are expected to be useful in accordance with the teachings of the present invention.

Target 18 was a 4 mm long by 2 mm thick slab of metallic silver. As stated, the effect has also been observed for Cd, Ag, Pd, Ru, and Mo targets, and it is anticipated that targets comprising Sn, Sb and other elements would behave similarly. It should be mentioned that a different portion of the target was accessed for each series of three or more plasma generation and excitation pulses. One manner of increasing the available area of the target is to use a cylindrical substrate having a helical groove cut into the outer surface thereof, onto which surface the target material is deposited. The multi-pulse excitation radiation is focused onto the portion of the surface between the grooved portions, and the cylinder rotated slightly with each set of pulses, thereby providing a fresh target surface for each set of pulses.

Mode-locked Ti:Sapphire laser oscillator, 22, and three stages of chirped-pulse pulse amplification, 24, not shown in FIG. 2, provided laser pump laser energy at 800 nm. Excitation pulses having wavelengths between about 0.2 μm and 1.5 μm are expected to be useful in accordance with the teaching of the present invention. Dielectric multilayer-coated beam-splitter, 26, intercepts the output, 28, of the third amplifier stage of amplifier 24 and directs about 20% of output laser energy 28 to pre-pulse arm, 30, (120 ps pulses). It should be mentioned that other splitting ratios and pulse durations would also work; 30% and 600 ps, respectively, as examples. The remainder, 32, of the third stage output was directed through a lens pair, 33, comprising an f=2 m and an f=−2 m cylindrical lenses, before being compressed to 8 ps pulses, 34, using vacuum grating compressor, 36. Pulse durations between about 0.1 ps and 30 ps are also expected to be useful in accordance with the teachings of the present invention. The repetition rate of soft x-ray laser 16 corresponds to the repetition frequency of 10 Hz for the two commercially available Nd:YAG lasers used to pump amplifiers in amplifier 24, not shown in FIG. 2. It was found that if the repetition rate of the third stage amplifier was reduced to 5 Hz, the pump beam mode quality improved. However, it is expected that in general, pulse repetition rates between 1 Hz and 500 Hz will be useful in accordance with the teachings of the present invention. An electromechanical shutter was placed on the pump beam of the first amplifier, not shown in FIG. 2, to allow for single shot data acquisition in some of the measurements.

Picosecond pulses 34 are focused into a line focus onto target 18 using collimating lens, 38, and parabolic mirror, 40 (a spherical mirror could also be used). For the present apparatus, the angle of incidence 20 was between about 67° and 76° with respect to the normal to the surface of target 18, but other grazing incidence angles will also work depending on the lasing ion chosen, and the wavelength of the light used to pump the soft x-ray laser. For optimized soft x-ray laser output, ions having higher atomic charge require larger angles with respect to the normal to the target. The second beam 30 generated by beam splitter 26 is in turn divided into two beams using the combination of waveplate, 42, and first cube polarizer, 44. Beam, 46, is directed through a first delay line, 48, formed by translation stage, 49, onto which mirrors, 50 and 52, are mounted, forming thereby early pre-pulse, 10. Beam, 54, is directed to second, longer delay line, 56, comprising mirrors, 58 and 60, mounted on translation stage, 62, to form main pre-pulse 12. The relative energy of each of pre-pulses 10 and 12 is selected by rotating waveplate 42. The two beams are recombined by second cube polarizer, 64, and the resulting beams are directed along the same path, 66. Lens pair, 68 and 70, focuses the overlapping beams into a line on the surface of soft x-ray target 18 which spatially overlaps with the excitation pulse 14 on this surface.

In one embodiment of the present apparatus, line foci (30 μm×4.1 mm FWHM) on target 18 were obtained for 120 ps pre-pulses 10 and 12 using a combination of an f=67.5 cm focal length spherical lens, 68, and an f=200 cm focal length cylindrical lens 70. For excitation pulse 14, multilayer-coated f=76.2 cm parabolic mirror 40 was placed at 7° from normal incidence in combination with an f=2 m, f=−2 m cylindrical lens pair, 33, which added a controllable amount of astigmatism to the excitation pulse. As stated hereinabove, the pre-pulses were directed towards target 18 at near normal incidence and the excitation pulse for creating a transient population inversion following the formation of the plasma was directed at a selected grazing incidence angle 20 to target 18. This angle was varied between about 64° and 76°, although an approximately 67° grazing incidence angle was found to be optimum for the irradiation of the Ag and Cd targets which generate laser action at about 13.9 nm and about 13.2 nm, respectively. The overlap of the two line foci on target was monitored by imaging the target onto a CCD (not shown in FIG. 2). The on-axis plasma emission was spectrally resolved and recorded using a 1200 l/mm gold-coated variably spaced spherical grating placed at 3° grazing incidence and a back-illuminated 1 in.$^2$ CCD detector placed 48 cm from the target (not shown in FIG. 2). Soft x-ray laser intensity, 72, was measured using combinations of Zr filters and meshes of measured transmissivity having attenuation factors up to 1500. The meshes were carefully positioned to avoid the formation of a Moire pattern that would cause a spatial variation of the transmissivity.

By selecting the length of delay lines 48 and 56, the time relationship among pulses 10, 12 and 14 is adjusted such that early pre-pulse 10 arrives a few nanosecond prior to second pre-pulse 12 (about 5 ns in the data shown hereinbelow), but delays between about 1 and 10 ns may be successfully employed). The main pre-pulse (pulse 12) is adjusted to arrive between about 10 ps and 1000 ps (more preferably, between about 100 ps and 700 ps depending on the x-ray laser media, but the exact optimum delay will also depend on the characteristics of the pulses.

Figure 3:
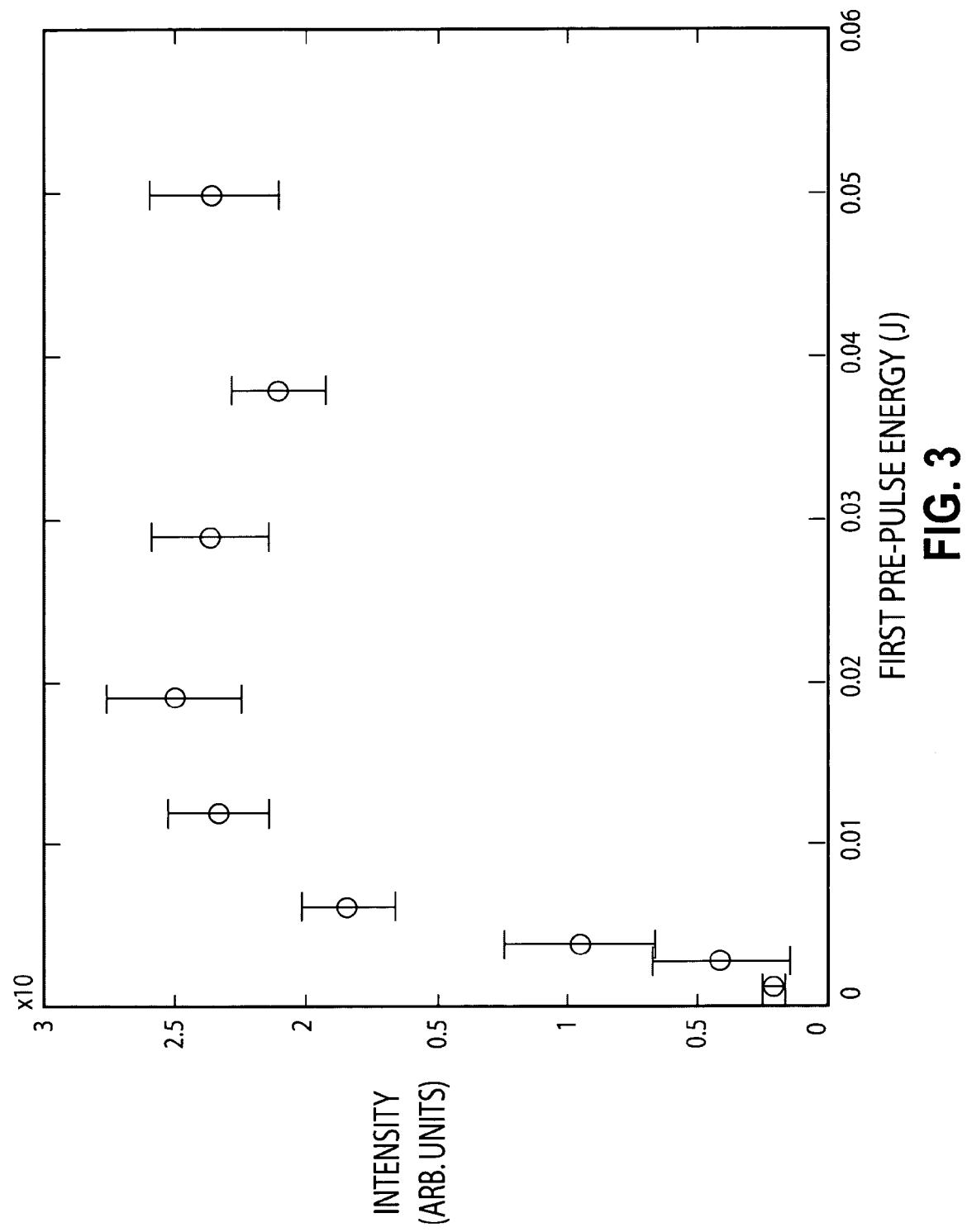
FIG. 3 is a graph of the output intensity of the soft x-ray laser of the present invention in arbitrary units for nickel-like silver ions at 13.9 nm as a function of the energy of the first prepulse, the two pre-pulses having a duration of about 120 ps, the second pre-pulse having an energy of approximately 300 mJ, both pre-pulses being directed approximately perpendicular to the target, the delay between the first pre-pulse and the second pre-pulse being approximately 5.6 ns, and the delay between the second pre-pulse and the main plasma excitation pulse having 1 J pulse energy, being approximately 300 ps with the grazing incidence angle being about 70° to the normal line to the target surface.

FIG. 3 is a graph of the output intensity in arbitrary units of the soft x-ray laser of the present invention for nickel-like silver ions at 13.9 nm as a function of the energy of the first pre-pulse, the two pre-pulses having a duration of about 120 ps, the second pre-pulse having an energy of approximately 300 mJ, both pre-pulses being directed approximately perpendicular to the target, the delay between the first pre-pulse and the second pre-pulse being approximately 5.6 ns, and the delay between the second pre-pulse and the main plasma excitation pulse having 1 J pulse energy, being approximately 300 ps with the grazing incidence angle being about 70° to the normal line to the target surface. It should be noticed that strong soft x-ray laser output is observed with first pre-pulse energies below 10 mJ.

Figure 4:
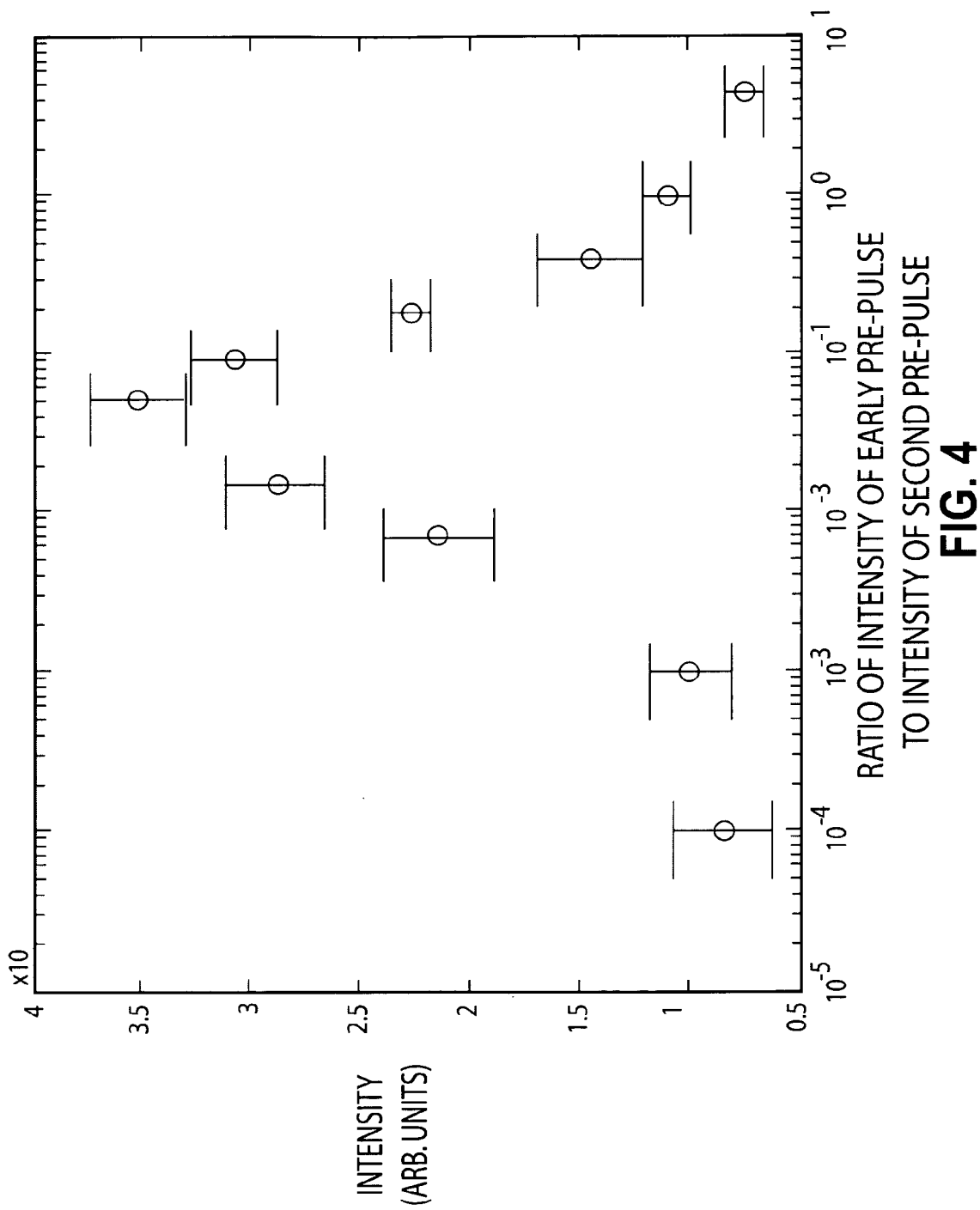
FIG. 4 is a graph of the output intensity of the soft x-ray laser of the present invention in arbitrary units as a function of the ratio of intensities between the first pre-pulse and the second prepulse described in FIG. 1 hereof for nickel-like silver ions at a wavelength of 13.9 nm, the two pre-pulses having a duration of about 120 ps, the delay between the first pre-pulse and the second prepulse being approximately 5.6 ns, both pre-pulses being directed approximately perpendicular to the target, and the delay between the second pre-pulse and the main plasma excitation pulse having 1 J pulse energy, being about 300 ps with the grazing incidence angle being about 70° to the normal line of the target surface.

FIG. 4 is a graph of the output intensity of the soft x-ray laser of the present invention in arbitrary units as a function of the ratio of intensities between the first pre-pulse and the second pre-pulse described in FIG. 1 hereof for nickel-like silver ions at 13.9 nm, the two pre-pulses having a duration of about 120 ps, the delay between the first pre-pulse and the second pre-pulse being approximately 5.6 ns, both pre-pulses being directed approximately perpendicular to the target, and the delay between the second pre-pulse and the main plasma excitation pulse having 1 J pulse energy, being about 300 ps with the grazing incidence angle being about 70° to the normal line to the target surface.

Figure 5:
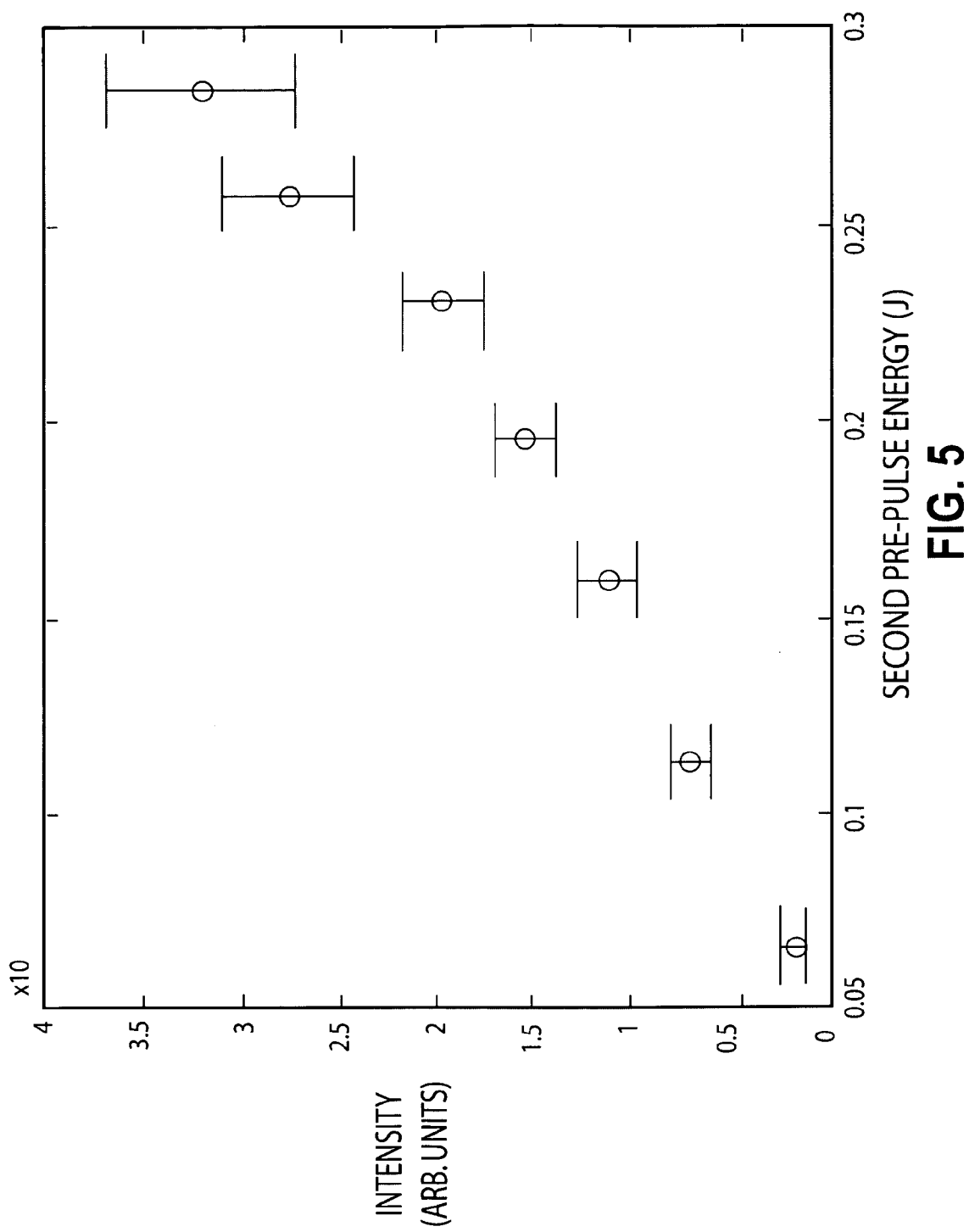
FIG. 5 is graph of the output intensity of the soft x-ray laser of the present invention in arbitrary units for nickel-like silver ions at 13.9 nm as a function of the energy of the second pre-pulse, the two pre-pulses having a duration of about 120 ps, the first pre-pulse having an energy of approximately 25 mJ, both pre-pulses being directed approximately perpendicular to the target, the delay between the first prepulse and the second pre-pulse being approximately 5.6 ns, and the delay between the second pre-pulse and the main plasma excitation pulse having 1 J pulse energy, being approximately 300 ps with the grazing incidence angle being about 70° with the normal line to the target.

FIG. 5 is graph of the output intensity of the soft x-ray laser of the present invention in arbitrary units for nickel-like silver ions at 13.9 nm as a function of the energy of the second pre-pulse, the two pre-pulses having a duration of about 120 ps, the first pre-pulse having an energy of approximately 25 mJ, both pre-pulses being directed approximately perpendicular to the target, the delay between the first pre-pulse and the second pre-pulse being approximately 5.6 ns, and the delay between the second pre-pulse and the main plasma excitation pulse having 1 J pulse energy, being approximately 300 ps with the grazing incidence angle being about 70° with normal line to the target surface.

The foregoing description of the invention has been presented for purposes of illustration and description and is not intended to be exhaustive or to limit the invention to the precise form disclosed, and obviously many modifications and variations are possible in light of the above teaching.

For example, the excitation laser can be other than a Ti:sapphire laser and can lase at other wavelengths; for example, a wavelength of approximately 1 μm or the second or third harmonic of such wavelengths. Shorter wavelengths provide the advantage in the implementation of the apparatus of the present invention of enhancing lasing at shorter x-ray wavelengths. Additionally, the pre-pulses could be generated using more than one laser each of which being synchronized to the laser which generates the main excitation pump pulse. Other apparatus than the delay lines described hereinabove could also be used to impart selected delays in the arrival times of the pulses at the target.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for generating soft x-ray laser radiation comprising the steps of:
   (a) directing at least one first laser pulse having a first chosen energy and a first chosen pulse width onto an exposed surface of a target comprising selected atoms at a first angle to the normal to the surface effective for generating an expanding plasma in the vicinity of the surface comprising ions of the selected atoms;
   (b) directing a second laser pulse having a second chosen energy and a second chosen pulse width onto the surface of the selected target at a second angle to the normal to the surface effective for increasing the degree of ionization of the ions of the expanding plasma, at a first chosen time after said step of directing at least one first laser pulse onto the target; and
   (c) directing a plasma excitation pulse having a third chosen energy and a third chosen pulse width into the plasma at a third chosen angle to the normal to the surface of the target effective for producing a population inversion in the ions of the plasma, the third chosen angle being greater than 40°, and at a second chosen time after said step of directing a second laser pulse onto the target, whereby soft x-ray laser radiation is generated.

2. The method of claim 1, wherein the first angle and the second angle are approximately 90°.

3. The method of claim 1, wherein the selected atoms form nickel-like ions in the plasma.

4. The method of claim 3, wherein the atoms are selected from the group consisting of Ru, Pd, Ag, Cd, Sn, and Mo.

5. The method of claim 1, wherein the selected atoms form neon-like ions in the plasma.

6. The method of claim 1, wherein the at least one first laser pulse, the second laser pulse and the plasma excitation pulse are directed to substantially the same area on the surface of the target.

7. The method of claim 6, wherein the at least one first laser pulse, the second laser pulse and the plasma excitation pulse are focused into substantially overlapping rectangles on the surface of the target.

8. The method of claim 1, wherein the third chosen angle is between about 50° and 80°.

9. The method of claim 1, wherein the first chosen time is between about 1 ns and 10 ns.

10. The method of claim 1, wherein the second chosen time is between about 10 ps and 1000 ps.

11. The method of claim 1, wherein the third chosen pulse width is between about 0.1 ps and 30 ps.

12. The method of claim 1, wherein the first chosen pulse width and the second chosen pulse width are between about 50 ps and 1000 ps.

13. The method of claim 1, wherein the first chosen energy is greater than about $10^{-3}$ J.

14. The method of claim 1, wherein the third chosen energy is between approximately 0.1 J and 100 J.

15. The method of claim 1, wherein the repetition rate of the first laser pulse, the second laser pulse, and the plasma excitation pulse is between approximately 1 Hz and 100 Hz.

16. The method of claim 1, wherein the selected atoms comprise silver atoms, and the soft x-radiation has a wavelength of about 13.9 nm.

17. The method of claim 1, wherein the selected atoms comprise cadmium ions, and the soft x-radiation has a wavelength of about 13.2 nm.

18. The method of claim 1, wherein the excitation laser pulses have a wavelength between about 0.2 μm and 1.5 μm.

19. An apparatus for generating soft x-ray laser radiation comprising in combination:
   (a) a target comprising selected atoms;
   (b) means for generating at least one first laser pulse having a first chosen energy and a first chosen pulse width;
   (c) means for directing said at least one first laser pulse onto an exposed surface of said target at a first angle to the normal to the surface of said target such that an expanding plasma comprising ions of the selected atoms is generated in the vicinity of the surface;

(d) means for generating a second laser pulse having a second chosen energy and a second chosen pulse width at a first chosen time after said at least one first laser pulse;

(e) means for directing said second laser pulse onto the surface of the said target at a second angle to the normal to the surface of said target such that the degree of ionization of the ions of the expanding plasma is increased;

(f) means for generating a plasma excitation pulse having a third chosen energy and a third chosen pulse width at a second chosen time after said second laser pulse; and (g) means for directing said plasma excitation pulse into the expanding plasma at a third chosen angle to the normal to the surface of said target such that the third angle is greater than 40°, such that a population inversion in the ions of the plasma is produced, and soft x-ray laser radiation is generated.

20. The apparatus of claim 19, wherein the first angle and the second angle are approximately 90°.

21. The apparatus of claim 19, wherein the selected atoms form nickel-like ions in the plasma.

22. The apparatus of claim 21, wherein the atoms are selected from the group consisting of Ru, Pd, Ag, Cd, Sn, and Mo.

23. The apparatus of claim 19, wherein the selected atoms form neon-like ions in the plasma.

24. The apparatus of claim 19, wherein the at least one first laser pulse, the second laser pulse and the plasma excitation pulse are directed to substantially the same area on the surface of said target.

25. The apparatus of claim 24, wherein the at least one first laser pulse, the second laser pulse and the plasma excitation pulse are focused into substantially overlapping rectangles on the surface of said target.

26. The apparatus of claim 19, wherein the third chosen angle is between about 50° and 80°.

27. The apparatus of claim 19, wherein the first chosen time is between about 1 ns and 10 ns.

28. The apparatus of claim 19, wherein the second chosen time is between about 10 ps and 1000 ps.

29. The apparatus of claim 19, wherein the third chosen pulse width is between about 0.1 ps and 30 ps.

30. The apparatus of claim 19, wherein the first chosen pulse width and the second chosen pulse width are between about 50 ps and 1000 ps.

31. The apparatus of claim 19, wherein the first chosen energy is greater than about $10^{-3}$ J.

32. The apparatus of claim 19, wherein the third chosen energy is between approximately 0.1 J and 100 J.

33. The apparatus of claim 19, wherein the repetition rate of the first laser pulse, the second laser pulse, and the plasma excitation pulse is between approximately 1 Hz and 100 Hz.

34. The apparatus of claim 19, wherein the selected atoms comprise silver atoms, and the soft x-radiation has a wavelength of about 13.9 nm.

35. The apparatus of claim 19, wherein the selected atoms comprise cadmium ions, and the soft x-radiation has a wavelength of about 13.2 nm.

36. The apparatus of claim 19, wherein the excitation laser pulses have a wavelength between about 0.2 μm and 1.5 μm.

* * * * *